United States Patent [19]
Dozeman et al.

[11] Patent Number: 5,907,004
[45] Date of Patent: May 25, 1999

[54] THERMOPLASTIC ELASTOMER

[75] Inventors: Albertus O. Dozeman, Born; Pieter Gijsman, Sittard, both of Netherlands

[73] Assignee: DSM N.V., Heerlen, Netherlands

[21] Appl. No.: 08/908,199

[22] Filed: Aug. 7, 1997

Related U.S. Application Data

[63] Continuation of application No. PCT/NL96/00040, Jan. 23, 1996.

[30] Foreign Application Priority Data

Feb. 7, 1995 [EP] European Pat. Off. ............ 95200282

[51] Int. Cl.$^6$ ...................................... C08K 5/34
[52] U.S. Cl. ............................ 524/100; 524/99; 524/102
[58] Field of Search ................ 524/99, 100, 102

[56] References Cited

U.S. PATENT DOCUMENTS 4,130,534  12/1978  Coran et al. ............................ 260/33.6
4,311,534   1/1982  Abdou-sabet et al. ................. 525/141
4,415,688  11/1983  Minagawa et al. ..................... 524/102

*Primary Examiner*—Kriellion S. Morgan
*Attorney, Agent, or Firm*—Pillsbury Madison & Sutro LLP

[57] ABSTRACT

The invention relates to a thermoplastic elastomer comprising a blend of a rubber and a thermoplastic resins the rubber being at least partially cured with a phenolic curative. The invention is that, to overcome problems with surface cracking, the thermoplastic elastomer also comprises a hydrolysis-insensitive HALS-compound.

The invention also relates to the preparation of such a thermoplastic elastomer.

24 Claims, No Drawings

THERMOPLASTIC ELASTOMER

This is a continuation of International Appln. No. PCT/NL96/00040 filed Jan. 23, 1996 which designated the U.S.

The invention relates to a thermoplastic elastomer comprising a blend of a rubber and a thermoplastic resin, the rubber being at least partially cured with a phenolic curative.

Such a product is known from U.S. Pat. No. 4,311,628, where a cured (or vulcanized) thermoplastic elastomer (or thermoplastic vulcanizate; TPV) is made from a polyolefin resin and EPDM rubber. The phenolic curative comprises a phenolic resin and a cure activator; the cure activator includes metal oxides and halogen donors.

A defect of such a thermoplastic elastomer is that in several cases products made therefrom show surface cracking within a short period of time. To delay this surface cracking problem, hindered amine light stabilizer compounds (HALS-compounds) can be added to the thermoplastic elastomer:, as is known from EP-A-404,357. However, the application of conventionally used HALS-compounds in such TPV's shows a log efficiency. This problem is much less pronounced when using such HALS compounds in polyolefins as such.

Surprisingly it has been found that when a specific type of HALS-compound is present the above mentioned problems can be significantly reduced or even be solved, as a result of which an UV-stable thermoplastic elastomer results with Improved physical, especially surface properties.

The invention is characterized in that the thermoplastic elastomer also comprises a hydrolysis-insensitive HALS-compound.

It was found that the conventionally used HALS-compounds, which consist of piparinidyl groups bridged by an estergroup (like Tinuvin®-770) undergo severe decomposition in such a thermoplastic elastomer. Spectroscopical identification showed decomposition products which were identified as products which can be formed upon hydrolysis of the estergroup in such an HALS-compound.

Here and hereafter, the term "hydrolysis-insensitive HALS-compound" refers to a HALS-compound, which in a temperature range of 100–300° C., does not show significant hydrolysis of the main chain of said HALS-compound.

The rubber present in the thermoplastic elastomer of the present invention may be any natural or synthetic rubber which can be cured with the aforementioned phenolic curative. This is especially the case for ethylene α-olefin diene terpolymer (EADM) and for butylrubber.

The earlier mentioned rubber (EADM) contains as the second monomer an α-olefin, which can be propylene, butene-1, pentene-1, hexene-1, octene-1 or the like or a branched isomer thereof like 4-methylpentene-1, and further styrene, a-methylstyrene and the like. Also mixtures of α-olefins are applicable. Preference is given to propylene and/or butene-1 as the α-olefin. Greater preference is given to propylene; the resulting terpolymer is a ethylene/propylene/diene terpolymer (EPDM). The third monomer in such an EADM or EPDM can be any conventionally applied monomer in such rubber, like hexadiene 1,4, dicyclopentadiene or ethylidene norbornene. Preference, based on its curing behaviour, is given to ethylidene norbornene as third monomer.

The butylrubber, when present as the essential rubber element of the thermoplastic elastomer of the present invention, is an amorphous copolymer of isobutylene and isoprene or an amorphous terpolymer of isobutylene, isoprene and a divinyl aromatic monomer. The term "butylrubber" also comprises the halogenated form of the above mentioned co- and terpolymer. Thermoplastic elastomers based on butylrubber are disclosed in e.g. U.S. Pat. No. 4,130,534 and EP-A-376,227.

The thermoplastic resin may be any polymer which behaves like a thermoplast in the temperature range between 100 and 350° C.; care should be taken that the processing temperature (i.e. the temperature at which the thermoplastic elastomer is prepared or used) is sufficiently lower than the decomposition temperature of the resin. Examples of such resin are thermoplastic resins like polyesters, nylons, polycarbonates, styrene/acrylonitril copolymers as well as the preferred thermoplastic polyolefin resins. In the latter case, preference is given to polyethylene and polypropylene.

The thermoplastic elastomer comprises 20–400 parts of rubber per 100 parts of thermoplastic resin, more preferably between 30–300 parts and most preferred between 100 and 300 parts.

The thermoplastic elastomer is at least partially cured with a phenolic curative. It is postulated that this curative is responsible for the problems mentioned before and that therefor also thermoplastic elastomers prepared with a different curing system but experiencing the same type of problems can use the present invention.

Any phenolic curing system which cures the rubber is suitable in the invention. Preference can be given to the phenolic curing systems mentioned in the above cited U.S. Pat. No. 4,311,628 (indicating both the phenolic curing resin and the cure activator).

The rubber in the thermoplastic elastomer is at least partially cured or crosslinked. One method for determining the degree of crosslinking is by measuring the amount of rubber, extractable from the product by using boiling xylene as the extractant. Such a method can be found in the earlier mentioned U.S. Pat. No. 4,311,628.

Based on that method, the rubber in the thermoplastic elastomer of the invention is cured to the extent that not more than 50%, preferably not more than 15% and even more preferred not more than 5% of the curable rubber is extractable in boiling xylene.

According to the invention the thermoplastic elastomer comprises an effective amount of an hydrolysis-insensitive HALS-compound. It has been found that some amount of the HALS-compound is inactivated by one or more of the ingredients of the elastomer. Without being bound to any scientific theory, it is assumed that this is a result of a complexation reaction between the HALS-compound and the phenolic curative. By the term "effective amount" is meant an amount of HALS-compound that takes care of the desired UV-stabilization and which takes into account the amount of HALS-compound being inactivated in the thermoplastic elastomer.

The HALS-compound to be used should be insensitive to hydrolysis. Conventional used HALS-compounds like Tinuvin-770 contain an estergroup as bridge between the UV-effective piperidinyl groups; this ester-group appears to be hydrolyzed under the conditions used for preparing and processing of the thermoplastic elastomer. In the HALS-compounds to be used in the present invention no ester group should be present in the main chain. A test to evaluate the suitability of potential HALS-compounds as UV-stabilizers can be done by testing the stability of such a compound towards hydrolysis in the temperature range of 100–300° C.; preferably this test is performed on the thermoplastic elastomer itself. When less than 5% of the potential HALS-compound is decomposed during a period of 30 minutes, using a molar ratio of water to HALS-compound of at least 1, this compound is considered to be a hydrolysis-insensitive HALS compound, useful for the invention.

Preferred HALS-compounds in the thermoplastic elastomer according to the invention have as one characteristic that in the molecule at least two hindered piperidinyl groups, coupled by a bridge, are present; said compound having the following structure:

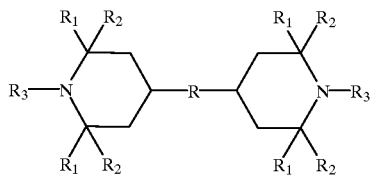
(1)

in which $R_1$ and $R_2$ are a lower alkyl group (1–5 C-atoms) and in which $R_3$ is hydrogen or an alkyl-, cycloalkyl-, aryl- or alkoxygroup with generally 1–20 C-atoms.

To be a hydrolysis-insensitive HALS-compound, the bridge group R may not have an ester group present in the main chain. The main chain of the R-group can be any (hydrocarbon) group consisting at least non-hydrolysable groups which are coupled to the at least two piperidinyl-groups.

Examples of HALS-compound which are not suited for application in the present invention are compounds as:

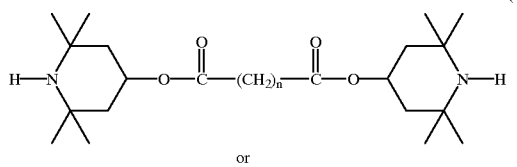
(2)

or

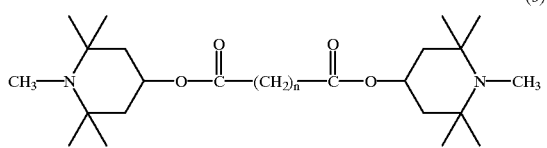
(3)

Compounds that are preferably suited for the present purpose are HALS-compounds of formula (1), wherein the main chain of R comprises nitrogen (N), oxygen (O) or phosphorus (P) containing groups coupled to a hydrocarbon group. Examples thereof are

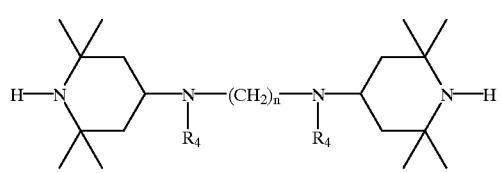
(4)

$R_4$ may be hydrogen, an alkylgroup, a

group; or a compound like

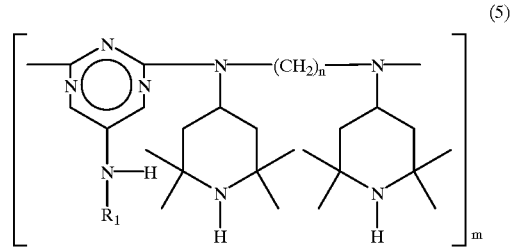
(5)

Compounds according to formula 1, which contain, in the main chain of R, phosphorus or oxygen in stead of or next to the nitrogen (N) are also suited in the present invention.

Commercially available compounds according to formula (4) are Uvinul 4050H from BASF (all substituents on the piperidinyl groups are methyl groups, n=6 and

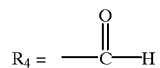

and HMBTAD from HALS (all substitutuents on the piperidinyl groups are methyl groups, n=6 and $R_4$=H).

Another criterium for the HALS-compound is that it on one hand is not too volatile under processing conditions (i.e. at temperatures between 100 and 300° C.) as a result of which the compound could evaporate from the thermoplastic elastomer, and on the other hand be sufficient mobile to be able to migrate through the product. This is preferably achieved when the HALS compound has a molecular weight between 250 and 5000, more preferably between 300 and 1000. One or more of the piperidinyl groups in any of the formula's 1,4 or 5 may be absent, still leaving the compound applicable according to the invention, provided that the R-group and the terminal group attached to said R-group provide such a HALS-compound with the same (hydrolysis-insensitive) properties as described above The HALS-compound comprised in the thermoplastic elastomer is generally present in an amount not exceeding 7.5 wt. %; more preference is given to an amount not exceeding 5 wt. %; even more preferred is an amount of 0.1–2.5 wt. %.

The amount of HALS-compound needed for achieving the desired effect is, as indicated before, dependant of the amount of deactivated HALS-compound. This can be determined easily in a separate experiment.

A way of minimizing the total amount of (expensive) HALS-compound at a constant effective amount is the addition of (cheap) scavengers that neutralize the alleged complexing effect of the phenolic curative. Suitable for this purpose is, amongst others, hydrotalcite $Mg_6Al_3(OH)_{16}CO_3 \cdot 4H_2O$, for example a product known under the tradename DHT-4A. Other examples of such complexing additives are alkali- and earth alkalimetal stearates, MgO, or organic amines. In general such an additive should have a Lewis base character.

As the HALS-compound (and if used the complexing additive) interferes with the phenolic curative, it is thus preferred that in the process for preparing the at least partially cured thermoplastic elastomer, a blend comprising uncured rubber and thermoplastic resin is first treated with the curative and thereafter the HALS-compound (and if used the complexing additive; preferably in the sequence: first the complexing additive and then the HALS-compound) is added. Then the optimal use of curing system and stabilizing system is obtained.

The process for preparing the thermoplastic elastomer can be any process by which a blend of an at least partially cured rubber and a thermoplastic resin can be obtained. Preference is given to a process in which the blend is made by dynamic curing (i.e. the process of mixing and curing of the rubber and the thermoplastic are taking place in one process step). It is to the skilled man to avoid severe premature vulcanization (curing) while the mixing-process is not completed. Reference can be given to the above mentioned U.S. Pat. No. 4,130,534 and U.S. Pat. No. 4,311,628 patents. Equipment to be used in a process according to the invention can be any mixing apparatus for blending polymers. Reference can be had to batch equipment (like Banbury mixers), preference is given to continuous operating equipment, like a twin screw extruder. Care should be taken that all ingredients are well-mixed.

Next to the above mentioned ingredients the thermoplastic elastomer can contain other additives and fillers commonly used in these types of products, like carbon black, pigments, flame retardants, processing aids, extender oils etc.

In the thermoplastic elastomer of the invention preferably also an UV-absorber is present. Such an absorber is known per se; reference can be made to J. Pospišil and P. P. Klemchuck in. "Oxidation inhibition in Organic Materials", vol. I, pag. 23 ff (1990). Examples of UV absorbers are cyanoacrylates, phenylsalicylates, oxanilides, (di-) hydroxybenzophenones and hydroxyphenylbenzotriazoles.

The products of the present invention are useful for making a variety of articles like hoses or moldings. These articles can be made by extrusion, injection or compression moulding techniques. They are especially useful in those type of applications where crack resistance and UV-stability plays a major role.

The invention will be elucidated by the following examples and comparative experiments They are not intended to form in any way a restriction of the invent ion.

EXAMPLE I

To a Sarlink®-3000 product of DSM, being a blend of polypropylene and EPDM dynamically vulcanized with a phenolic curative (the blend containing 215 parts of EPDM per 100 parts of polypropylene and having 11% of the rubber extractable in boiling xylene) was added the below indicated amounts of the HALS-compound Uvinul 4050H (having a molecular weight of 450). The compounding was done on a Berstorff ZE 25 extruder at a speed of 200 rpm and a cylinder temperature of 220° C. The resulting products were injection moulded, whereafter the UV-resistance was tested in a Weather-O-Meter (WOM), using a CL 65, Xenon lamp, having an intensity of 0.35 W/m$^2$ at 340 nm and a black panel temperature of 63° C. In the following Table 1 the time, after which cracks are clearly observed in the molded product, are indicated.

TABLE 1

| Example | HALS amount (wt. %) | complexing agent* | amount Compl. agent (wt. %) | time (hours) |
|---|---|---|---|---|
| I.1 | 2.5 | — | — | >4500 |
| I.2 | 0.4 | DHT-4A | 2 | >4500 |

TABLE 1-continued

| Example | HALS amount (wt. %) | complexing agent* | amount Compl. agent (wt. %) | time (hours) |
|---|---|---|---|---|
| I.3 | 0.4 | Ca-st. | 1.5 | >1500 |
| I.4 | 0.4 | MgO | 1.5 | >2000 |

*Ca-st = calcium stearate
MgO = magnesium oxide

Comparative Experiment A

Example I was repeated, but use was made of the HALS-compound Tinuvin-770, which, as indicated before, contains ester groups in the main chain. The results are given in Table 2.

TABLE 2

| Experiment | HALS amount (wt. %) | time (hours) |
|---|---|---|
| A | 2.5 | 1000 |

We claim:

1. A thermoplastic elastomer, comprising a blend of a rubber and a thermoplastic resin, the rubber being at least partially cured with a phenolic curative, characterized in that the thermoplastic elastomer also comprises a hydrolysis-insensitive HALS-compound, wherein said HALS-compound is stable towards hydrolysis of the main chain in the temperature range of 100–300° C.

2. The thermoplastic elastomer of claim 1, wherein the main chain of the hydrolysis-insensitive HALS-compound comprises N, O or P containing groups, coupled to a hydrocarbon group.

3. The thermoplastic elastomer of claim 1, wherein in the main chain of the hydrolysis-insensistive HALS-compound, an ester group is absent.

4. The thermoplastic elastomer of any one of claims 1–3, wherein the rubber is selected from EADM and butyl rubber.

5. The thermoplastic elastomer of claim 4, wherein the EADM rubber is a terpolymer of ethylene, propylene and ethylidene norbornene.

6. The thermoplastic elastomer of claim 1, wherein the thermoplastic resin is a thermoplastic polyolefin resin.

7. The thermoplastic elastomer of claim 6, wherein the thermoplastic polyolefin resin is selected from polyethylene and polypropylene.

8. The thermoplastic elastomer of claim 1, wherein the rubber in the elastomer is cured to the extent that not more than 15% of the curable rubber is extractable in boiling xylene.

9. The thermoplastic elastomer of claim 8, wherein not more than 5% of the curable rubber is extractable in boiling xylene.

10. The thermoplastic elastomer of claim 1, wherein the elastomer comprises 30–300 parts of rubber per 100 parts of thermoplastic resin.

11. The thermoplastic elastomer of claim 1, wherein the hydrolysis-insensitive HALS-compound has a molecular weight between 250 and 5000.

12. The thermoplastic elastomer of claim 11, wherein said hydrolysis-insensitive HALS-compound has a molecular weight between 300–1000.

13. The thermoplastic elastomer of claim 1, wherein the hydrolysis-insensitive HALS-compound is present in an amount not exceeding 5 wt. %.

14. The thermoplastic elastomer of claim 13, wherein said hydrolysis-insensitive HALS-compound is present in an amount between 0.1 and 2.5 wt. %.

15. The thermoplastic elastomer of claim 1, wherein the elastomer comprises a combination of an additive having a Lewis base character and the hydrolysis-insensitive HALS-compound.

16. A process for the preparation of a thermoplastic elastomer of claim 1, comprising making a blend comprising a rubber at least partially cured with a phenolic curative, and a thermoplastic resin, after which a hydrolysis-insensitive HALS-compound has been added.

17. The process of claim 16, further comprising adding a combination of complexing additive and a hydrolysis-insensitive HALS-compound after the curing.

18. The process of claim 16, wherein the blend is made by dynamic curing.

19. The process of claim 17, wherein the blend is made by dynamic curing.

20. The thermoplastic elastomer of claim 1, wherein said HALS-compound is represented by the formula I

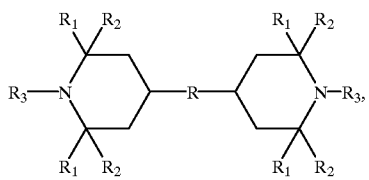

(I)

in which $R_1$ and $R_2$ are a lower alkyl group, R3 is hydrogen or an alkyl-, cycloalkyl-, aryl-, or alkoxy- group with 1–20 carbon atoms.

21. The thermoplastic elastomer of claim 20, wherein the main chain of R in formula I comprises N, P or O containing groups coupled to a hydrocarbon group.

22. The thermoplastic elastomer of claim 20, wherein said HALS-compound is

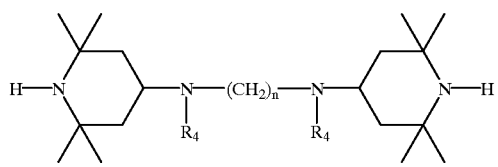

wherein R4 is hydrogen, an alkyl- group, a

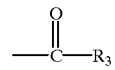

group, or the compound

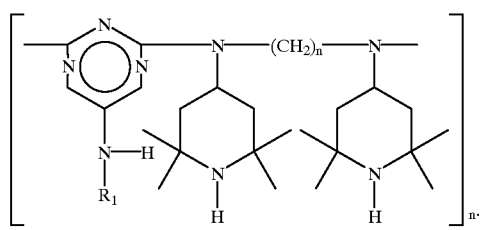

23. The thermoplastic elastomer of claim 22, wherein said R4 is

group or a H-group, and n=6.

24. A thermoplastic elastomer, comprising a blend of a rubber and a thermoplastic resin, the rubber being at least partially cured with a phenolic curative, characterized in that the thermoplastic elastomer also comprises a hydrolysis-insensitive HALS-compound,
  wherein said HALS-compound is stable towards hydrolysis of the main chain in the temperature range of 100–300° C., and
  wherein said HALS compound decomposes less than 5% during a period of 30 minutes using a molar ratio of water to HALS compound of at least 1.

* * * * *